United States Patent
Cleveland (10) Patent No.: US 8,290,067 B2
(45) Date of Patent: *Oct. 16, 2012

(54) SPECTRUM SHARING IN A WIRELESS COMMUNICATION NETWORK

(75) Inventor: Joseph R. Cleveland, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1608 days.

This patent is subject to a terminal disclaimer.

(21) Appl. No.: 11/725,749

(22) Filed: Mar. 20, 2007

(65) Prior Publication Data

US 2008/0112308 A1    May 15, 2008

Related U.S. Application Data

(60) Provisional application No. 60/858,589, filed on Nov. 13, 2006.

(51) Int. Cl.
*H04K 1/10*    (2006.01)

(52) U.S. Cl. ........ 375/260; 375/295; 375/316; 375/340; 370/203; 370/204; 370/208; 370/210; 370/276; 370/278; 370/281; 370/295; 370/310; 370/311; 370/319; 370/329; 370/343; 370/344; 370/464; 370/480; 455/39; 455/73; 455/91; 341/173; 341/180

(58) Field of Classification Search .................. 375/260, 375/340, 295, 316; 370/203, 204, 208, 210, 370/311, 331, 343, 276, 278, 281, 295, 310, 370/319, 329, 344, 464, 480; 455/39, 73, 455/91; 341/173, 180

See application file for complete search history.

(56) References Cited

U.S. PATENT DOCUMENTS

| | | | |
|---|---|---|---|
| 7,236,554 B2* | 6/2007 | Gupta | 375/355 |
| 7,526,248 B2* | 4/2009 | Gould et al. | 455/11.1 |
| 7,583,624 B2* | 9/2009 | Wang et al. | 370/311 |
| 7,813,315 B2* | 10/2010 | Cleveland et al. | 370/328 |
| 2006/0223460 A1 | 10/2006 | Himayat et al. | |
| 2006/0233270 A1 | 10/2006 | Ahn et al. | |
| 2007/0109973 A1 | 5/2007 | Trachewsky | |
| 2007/0140106 A1 | 6/2007 | Tsai et al. | |
| 2007/0286127 A1* | 12/2007 | Inohiza | 370/331 |
| 2008/0025330 A1 | 1/2008 | Wang | |
| 2008/0049709 A1 | 2/2008 | Pan et al. | |
| 2008/0056200 A1 | 3/2008 | Johnson | |
| 2008/0080432 A1 | 4/2008 | Lu et al. | |
| 2008/0089223 A1 | 4/2008 | Wu et al. | |
| 2008/0089282 A1 | 4/2008 | Malladi et al. | |
| 2008/0101440 A1 | 5/2008 | Lee | |
| 2010/0097997 A1 | 4/2010 | Sandhu | |

* cited by examiner

*Primary Examiner* — Leon Flores (57) ABSTRACT

A system and method for synchronous spectrum sharing for use in a wireless communication system based on orthogonal frequency-division multiplexing (OFDM) or orthogonal frequency division multiple access (OFDMA) signaling is disclosed. The system includes a frame detector configured to detect a frame of a broadcast waveform and extract sub-carrier information from the frame. Sub-carrier information may include information on usable sub-carrier and pilot sub-carriers for secondary users. The system allows transmitting data from the secondary user node in unused sub-carriers thereby making efficient use of unused or idle spectrum. Accordingly, secondary users of wireless communication systems can dynamically form ad-hoc mesh network communications in fixed or mobile scenarios.

23 Claims, 10 Drawing Sheets

SPECTRUM SHARING IN A WIRELESS COMMUNICATION NETWORK

CROSS-REFERENCE TO RELATED APPLICATION(S) AND CLAIM OF PRIORITY

The present application is related to U.S. Provisional Patent No. 60/858,589, filed Nov. 13, 2006, entitled "Asynchronous Spectrum Sharing Between Ad Hoc Networks and Cellular Networks that use OFDM/OFDMA Signaling". U.S. Provisional Patent No. 60/858,589 is assigned to the assignee of the present application and is hereby incorporated by reference into the present application as if fully set forth herein. The present application hereby claims priority under 35 U.S.C. §119(e) to U.S. Provisional Patent No. 60/858,589.

TECHNICAL FIELD OF THE INVENTION

The present disclosure relates generally to communication networks and, in particular, to systems for spectrum sharing in wireless communication systems.

BACKGROUND OF THE INVENTION

Conventional fixed spectrum allocation schemes lead to significant spectrum under-utilization. For instance, experiments have indicated that as much as 62% of the spectrum below the 3 GHz band is idle even in the most crowded areas (e.g., near downtown Washington D.C. where both government and commercial spectrum usage is intensive). Such under-utilization and increasing demand for the radio spectrum suggest that a more effective spectrum allocation and utilization policy is necessary.

Currently, secondary users may use the licensed spectrum only when the spectrum owner authorizes such use and when such use does not interfere with a primary user's communication. Such requirements imply that the use of the spectrum varies with time (i.e., dynamically changes), and is dependent on the load imposed by the primary users. Several conventional systems use multiple channels in wireless networks. However, such systems fail in dynamic spectrum access networks. For example, conventional systems assume that the set of available channels is static (i.e., the channels available for use are fixed at the time of network initiation). In multiple access wireless networks, however, such as Worldwide Interoperability for Microwave Access (WiMAX) with orthogonal frequency division multiple access (OFDMA) signaling, specified in IEEE-802.16 (2004) (also known as IEEE802.16d) and IEEE-802.16 (2005) (also known as IEEE802.16e), the set of available channels dynamically changes.

There is therefore a need for spectrum sharing systems for use in dynamic spectrum sharing networks such as, for example, OFDM/OFDMA signaling.

SUMMARY OF THE INVENTION

The present disclosure provides systems and methods for spectrum sharing in wireless communication systems.

In one embodiment, the present disclosure provides a spectrum sharing system for use in a wireless communication system. The wireless communication system includes a primary user node and a secondary user node. The system includes a frame detector configured to detect a frame of a broadcast waveform and to extract subframe information identifying usable sub-carriers for the frame to the secondary user node. The secondary user node transmits data in a first one of usable sub-carriers identified in the subframe information.

In another embodiment, the present disclosure provides a method of spectrum sharing for use in a wireless communication network having a primary user node and a secondary user node. The method includes detecting a frame of a broadcast waveform and extracting subframe information identifying usable sub-carriers for the frame by the secondary user node. The method also includes transmitting data from the secondary user node in a first sub-carrier identified in the subframe information.

In still another embodiment, the present disclosure provides an apparatus for forming an ad hoc mesh network, for use in a wireless communication system. The apparatus includes a secondary user node having a node modem. The apparatus also includes a frame detector configured to detect a frame of a broadcast waveform and extract subframe information for the frame to the secondary user node. The secondary user node transmits data in a first unused sub-carrier identified in the subframe information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
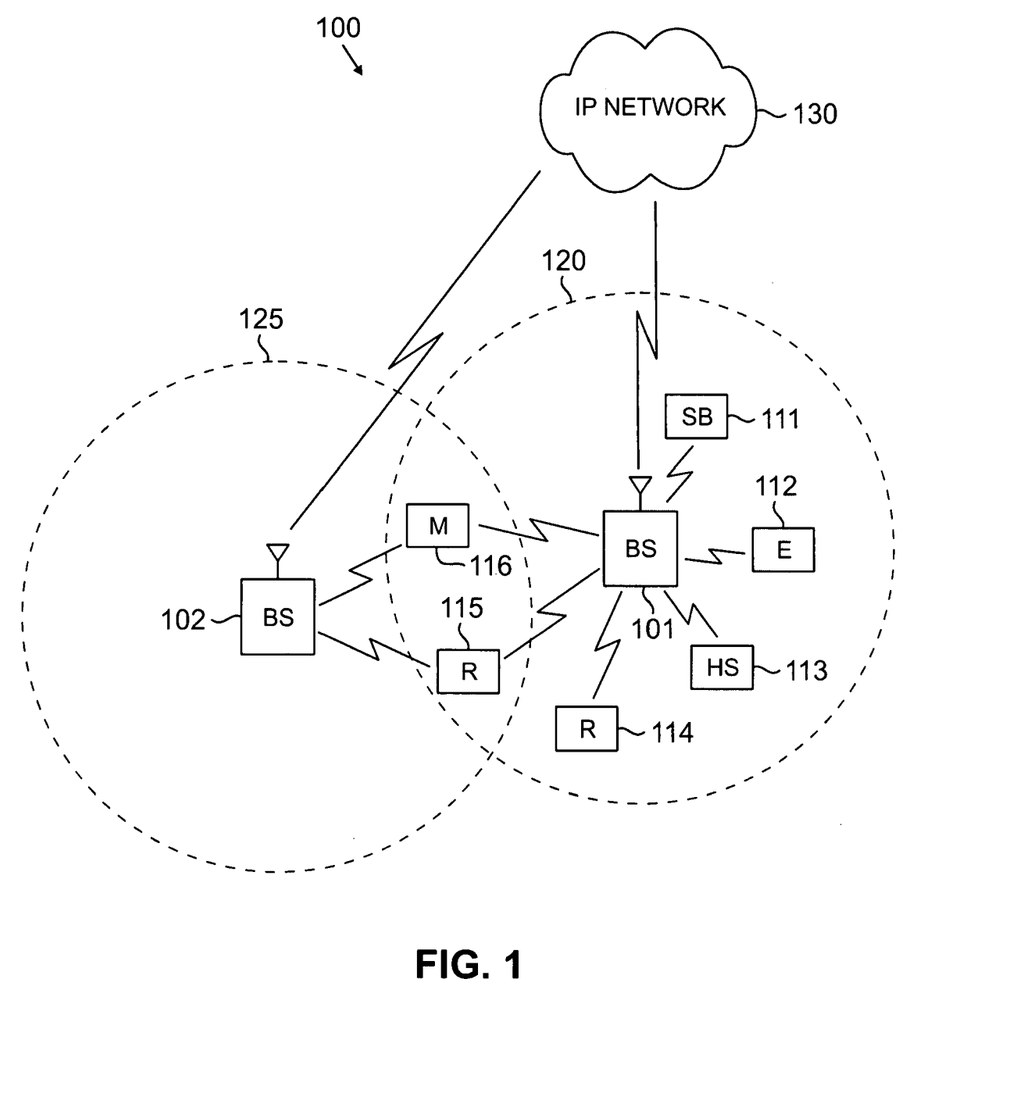
FIG. 1 is an exemplary wireless network suitable for spectrum sharing according to one embodiment of the present disclosure.

FIG. 1 illustrates an exemplary wireless network 100 suitable for spectrum sharing according to one embodiment of the present disclosure. In the illustrated embodiment, wireless network 100 includes base station (BS) 101 and base station (BS) 102. Base station 101 and base station (BS) 102 may communicate with each other over a backhaul network. Base station 101 and base station (BS) 102 may also communicate with each other over Internet protocol (IP) network 130, such as the Internet, a proprietary IP network, or other data network. In an exemplary embodiment, base stations 101 and 102 may communicate with each other using an IEEE-802.16 wireless metropolitan area network standard, such as, for example, an IEEE-802.16e standard.

In another embodiment, however, a different wireless protocol may be employed, such as, for example, a HIPERMAN wireless metropolitan area network standard. Base station 101 may communicate through direct line-of-sight or non-line-of-sight with base station 102, depending on the technology used for the wireless backhaul. Base station 101 and base station 102 may each communicate through non-line-of-sight with subscriber stations 111-116 using OFDM and/or OFDMA techniques.

Base station 101 provides wireless broadband access to network 130 to a first plurality of subscriber stations within coverage area 120 of base station 101. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence (R), SS 115 may be located in a second residence (R), and SS 116 may be a mobile (M) device.

Base station 102 provides wireless broadband access to network 130 to a second plurality of subscriber stations within coverage area 125 of base station 102. The second plurality of subscriber stations includes subscriber station 115 and subscriber station 116. In alternate embodiments, base stations 101 and 102 may be connected directly to the Internet by means of a wired broadband connection, such as an optical fiber, DSL, cable or T1/E1 line.

In other embodiments, base station 101 may be in communication with either fewer or more subscriber stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 101 and base station 102 and may be said to be operating in handoff mode, as known to those of skill in the art.

Base station 101 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 101 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 101 and 102, may extend in the range from less than one kilometer to about forty kilometers from the base stations.

As is well known in the art, a base station, such as base station 101 or 102, may employ directional antennas to support a plurality of sectors within the coverage area. In FIG. 1, base stations 101 and 102 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 and base station 102 may comprise a broadband connection, for example, a fiber optic line, to servers located in a central office or another operating company point-of-presence. The servers may provide communication to an Internet gateway for Internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

Figure 2:
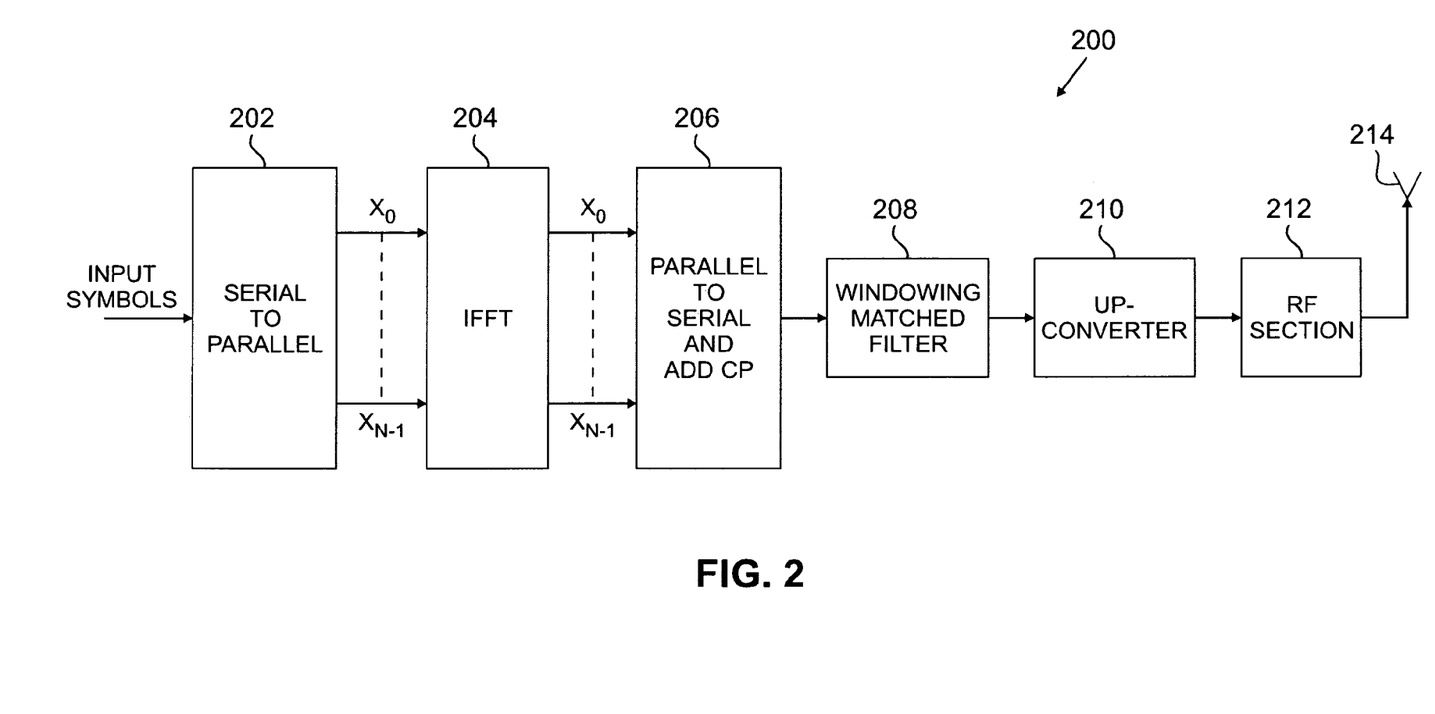
FIG. 2 is an exemplary block diagram of an orthogonal frequency-division multiplexing (OFDM) transmitter according to one embodiment of the present disclosure.

FIG. 2 is exemplary block diagram of a typical OFDM/OFDMA transmitter 200 according to one embodiment of the present disclosure. Transmitter 200 constructs, for example, an OFDM/OFDMA composite signal by first passing the serial output of a formatted, encoded, interleaved data signal through serial-to-parallel converter 202. Serial-to-parallel converter 202 separates each data signal into parallel data streams (e.g., $X_0 \ldots X_{N-1}$). A mapping function (MAP) within serial-to-parallel converter 202 maps each parallel data stream into I and Q modulation symbols, which are then applied to inverse fast Fourier transform (IFFT) block 204. The subcarrier separation is preferably an inverse of the OFDM symbol duration. IFFT block 204 computes the IFFT of each data stream and passes the output to parallel-to-serial and cyclic prefix (CP) block 206.

Parallel-to-serial and CP block 206 combines each parallel data stream into a data signal and introduces CP to aid in eliminating inter-symbol interference (ISI) and inter-block interference as later described in detail herein. For operation in time division duplex (TDD) mode, parallel-to-serial and CP block 206 inserts a guard interval (GI) into the signal. The output of parallel-to-serial and CP block 206 is passed to windowing matched filter 208 and then to up-converter block 210. The output of up-converter block 210 is then passed to RF section block 212 and transmitted via antenna 214. Accordingly, in the exemplary embodiment shown in FIG. 2, user data signals may be represented by a set of $2^J$ subcarriers. It should be understood that the complexity of fast Fourier transform processing is reduced when the number of sample points is a power of two. In addition, pilot plus control signaling may be represented by a set of M separate subcarriers. In one embodiment, N may be a power of 2 (e.g., $N=2^J$) and M may be a different power of 2 (e.g., $M=2^K$, where K<J).

Figure 3:
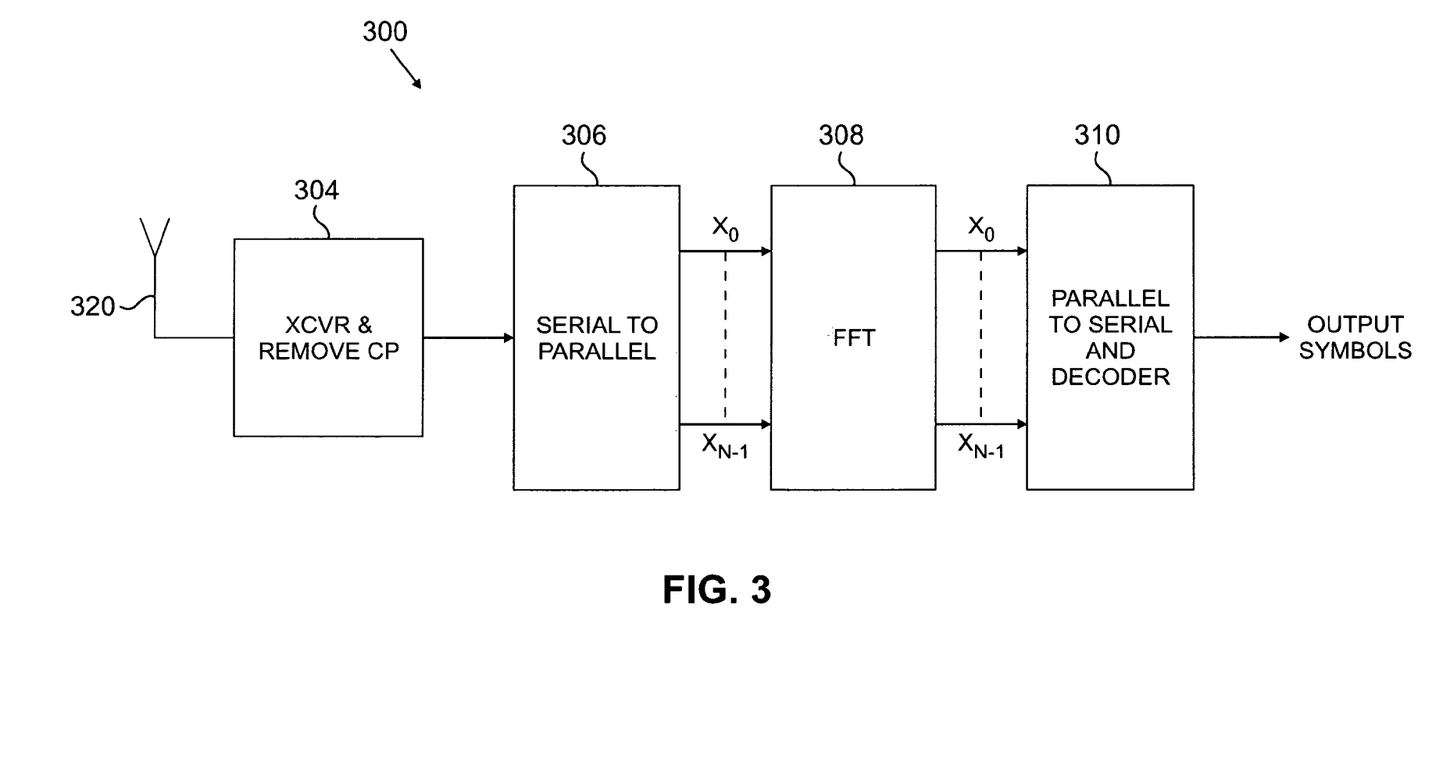
FIG. 3 is an exemplary block diagram of an OFDM receiver according to one embodiment of the present disclosure.

FIG. 3 is an exemplary block diagram of a typical OFDM/OFDMA receiver 300 according to one embodiment of the present disclosure. Receiver 300 detects the transmitted symbols and essentially reverses the process implemented by transmitter 200 described above. For example, the signal transmitted by antenna 214 is received by antenna 302. The signal is passed to transceiver and CP remove block 304. Transceiver and CP remove block 304 removes the CP from the signal and passes the signal to serial-to-parallel block 306. Serial-to-parallel block 306 separates the data signal into parallel data streams (e.g., $X_0 \ldots X_{N-1}$). A MAP within serial-to-parallel converter 201 maps each parallel data stream into I and Q modulation symbols, which are then passed to fast Fourier transform (FFT) block 308. The output of FFT block 308 is then passed to parallel-to-serial and decoder block 310 and then output as desired.

Figure 4:
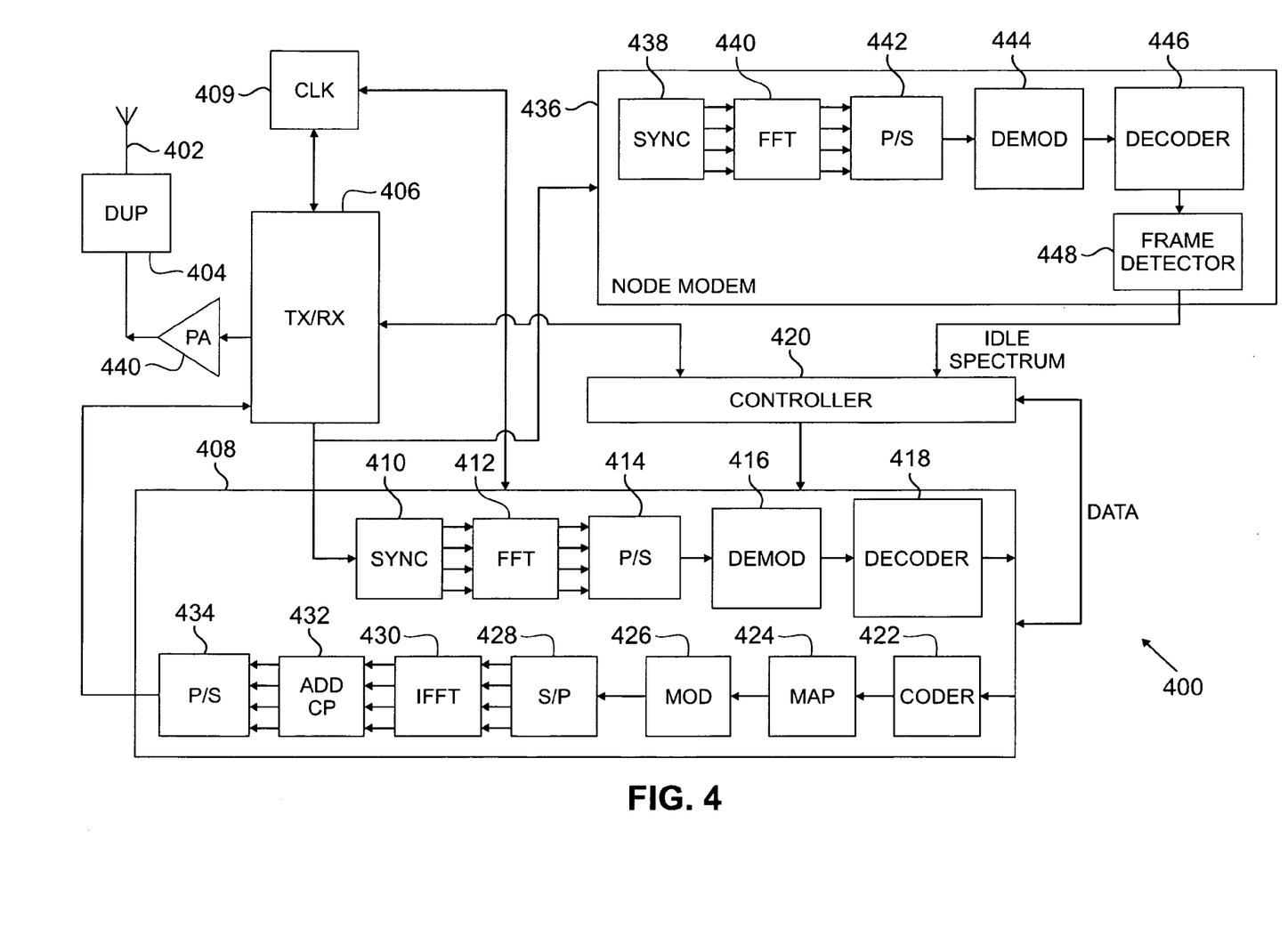
FIG. 4 is a simplified block diagram illustrating an exemplary system for the ad-hoc use of OFDM/OFDMA spectrum by a secondary spectrum user according to one embodiment of the present disclosure.

FIG. 4 is a somewhat simplified block diagram illustrating OFDM detector system 400. System 400 is suitable for ad-hoc use of OFDM/OFDMA spectrum by a secondary user according to one embodiment of the present disclosure. System 400 includes antenna 402 to receive and transmit signals. Antenna 402 is operably connected to a suitable duplexer 404.

When antenna 402 receives a signal, duplexer 404 passes the signal to transceiver 406. Transceiver 406 may be any suitable transceiver such as, for example, a radio frequency integrated circuit (RFIC) transceiver. Transceiver 406 removes the CP from the signal and passes the signal to processing block 408. It should be understood that processing block 408 may be any suitable signal processing circuit. Processing block 408 and transceiver 406 may be synchronized using clock/synchronizer module 409.

While in processing block 408, synchronizer 410 synchronizes and then separates the data signal into parallel data streams such as, for example, $X_0 \ldots X_{N-1}$. A MAP within synchronizer 410 maps each parallel data stream into I and Q modulation symbols, which are then passed to fast Fourier transform (FFT) block 412. The output of FFT block 412 is then passed to parallel-to-serial block 414. The output of parallel-to-serial block 414 is passed to demodulator 416 where the signal is demodulated and subsequently passed on to decoder block 418. The output of decoder block 418 is then passed to controller 420.

Similarly, before antenna 402 can transmit a signal from controller 420, the OFDM/OFDMA composite signal generally passes through processing block 408. Controller 420 generally includes processing circuitry (not shown) and memory (not shown) that execute an operating program. The operating program generally controls the operation of node modem 436 in an ad hoc mode as later described in detail herein.

Controller 420 is preferably configured to communicate with other nodes in the network on an ad hoc basis. Under normal conditions, controller 420 directs the operation of node modem for bidirectional communications in the forward and reverse channels. The forward channel generally refers to outbound signals from the ad hoc node to other ad hoc nodes in the network. The reverse channel, on the other hand, generally refers to inbound signals from other ad hoc nodes in the network.

In transmit mode, the composite signal is coded in coding block 422 and mapped using mapping block 424. The output of mapping block 424 is modulated in modulation block 426 and then passed through serial-to-parallel converter 428. Accordingly, the OFDM/OFDMA composite signal is a formatted, encoded and interleaved data signal. Serial-to-parallel converter 428 separates each data signal into parallel data streams (e.g., $X_0 \ldots X_{N-1}$). A mapping function (MAP) within serial-to-parallel converter 428 maps each parallel data stream into I and Q modulation symbols, which are then applied to inverse fast Fourier transform (IFFT) block 430. The subcarrier separation is preferably an inverse of the symbol rate.

IFFT block 430 computes the IFFT of each data stream and passes the output to cyclic prefix (CP) block 432. CP block 432 introduces CP to aid in eliminating inter-symbol interference (ISI) and inter-block interference as described in detail herein. The parallel-to-serial block 434 combines each parallel data stream into a data signal and sums the multiple sub-carriers to the transmission frequency. For operation in time division duplex (TDD) mode, CP block 432 inserts a guard interval (GI) into the signal. The output of parallel-to-serial 434 is passed to windowing matched filter (not shown)

and then to transceiver 406. The signal is passed to power amplifier 440, duplexer 404 before being transmitted by antenna 402.

For the reverse channel, transceiver 406 receives from antenna 402 an incoming RF signal and down-converts the signal to produce an intermediate frequency (IF) or baseband signal in node modem 436. Node modem 436 may also include additional routing protocols and may be any suitable node controller or modem including, for example, MANET node controllers.

Node modem 436 performs base-band processing including, for example, the processing of any digitized received signal to extract the information or data bits conveyed from the received signal. Any suitable process may be used to extract information from the received signal. For example, synchronizer 438 synchronizes and then separates the data signal into parallel data streams such as, for example, $X_0 \ldots X_{N-1}$. A MAP within synchronizer 438 maps each parallel data stream into I and Q modulation symbols, which are then passed to fast Fourier transform (FFT) block 440. The output of FFT block 440 is passed to parallel-to-serial block 442 and then to demodulator 444 where the signal is demodulated and subsequently passed on to decoder block 446. The output of decoder block 446 is then passed to frame detector 448.

Frame detector 448 detects the OFDM waveform broadcast by one or more macrocell base transceiver stations. Thereafter, frame detector 448 forwards any idle spectrum information to controller 420. Controller 420, in turn, directs the selection of OFDM sub-carriers by node modem 436.

At this point, if a secondary user has data to transmit, the secondary user transmits the data to a neighboring secondary node or nodes in the idle spectrum space identified by frame detector 448 and controller 420 as later described herein in conjunction with FIG. 6. Frame detector 448 sends idle block information to node modem 436 in response to the transmitting need of the secondary user. In one scenario, the secondary user or users may transmit a signal identical or substantially identical to the OFDMA signal used by the primary users. In another scenario, the secondary user transmits a signal that does not exceed the spectrum allowed by idle sub-carriers. If a secondary user does not have data to transmit, the secondary user listens for data symbols transmitted by neighboring secondary nodes on idle sub-carriers during the idle symbol periods.

Figure 5:
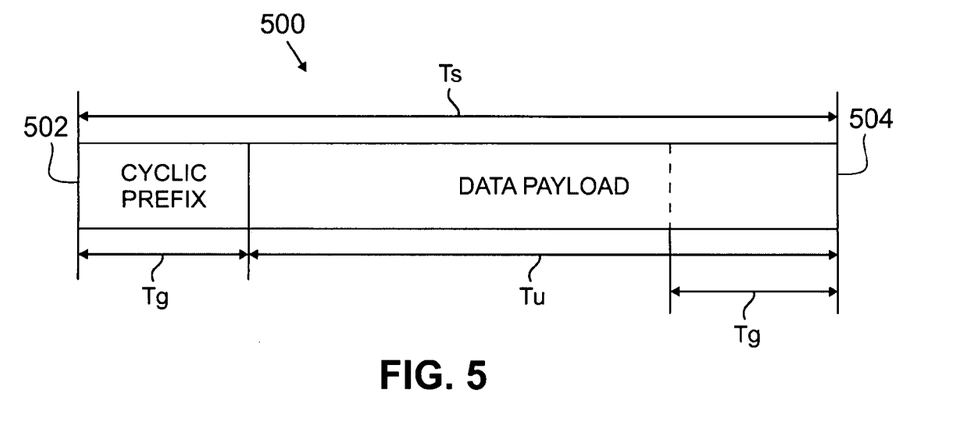
FIG. 5 depicts an exemplary OFDM symbol data payload inserted with a cyclic prefix (CP) for a given OFDM symbol period according to one embodiment of the present disclosure.

FIG. 5 illustrates OFDM symbol 500 in which CP 502 is inserted into data payload 504 according to one embodiment of the present disclosure where the total symbol period ($T_s$) is greater than the sum of the guard times ($T_g$) and the useful symbol period ($T_u$). OFDM waveforms provide increased symbol duration (i.e., $T_s$ and $T_u$) and thus improve the robustness of OFDM to delay spread. Accordingly, with the introduction of CP 502, ISI can be eliminated as long as the duration of CP 502 is longer than the channel delay spread. CP 502 is typically a repetition of the last samples of data portion of the block that is appended to the beginning of data payload 504 as shown in FIG. 5. CP 502 prevents inter-block interference and makes the channel appear circular. CP 502 therefore permits low-complexity frequency domain equalization. While CP 502 somewhat reduces bandwidth efficiency, the impact of CP 502 is similar to the "roll-off factor" in raised-cosine filtered single-carrier systems. Notably, OFDM has a very sharp, almost "brick-wall" spectrum. Thus, a large fraction of the allocated channel bandwidth may be utilized for data transmission and for moderating the loss in efficiency due to CP 502.

Similar attributes exist for OFDMA. The OFDMA symbol structure consists of three types of sub-carriers: (1) Data sub-carriers for data transmission; (2) Pilot sub-carriers for estimation and synchronization purposes; and (3) Null sub-carriers for no transmission (typically used for guard bands and DC carriers). The active sub-carriers (i.e., data and pilot sub-carriers) are generally grouped into subsets of sub-carriers called sub-channels.

The WiMAX OFDMA physical layer (PHY) generally supports sub-channelization in both the up-link (UL) and the down-link (DL). In certain standards such as, for example, IEEE-802.16-2004 and IEEE-802.16-2005, the minimum frequency-time resource unit of sub-channelization is one slot. One slot is typically equal to forty-eight (48) data tones or sub-carriers. The two types of sub-carrier permutations for sub-channelization are the diversity permutation and the contiguous permutation. The diversity permutation draws sub-carriers pseudo-randomly to form a sub-channel and provides frequency diversity and inter-cell interference averaging.

The diversity permutations include downlink (DL) FUSC (Fully Used Sub-Carrier), DL PUSC (Partially Used Sub-Carrier) and uplink (UL) PUSC and additional optional permutations. With DL PUSC, for each pair of OFDM symbols, the available or usable sub-carriers are grouped into clusters containing fourteen (14) contiguous sub-carriers per symbol, with pilot and data allocations in each cluster in the even and odd symbols.

Figure 8A:
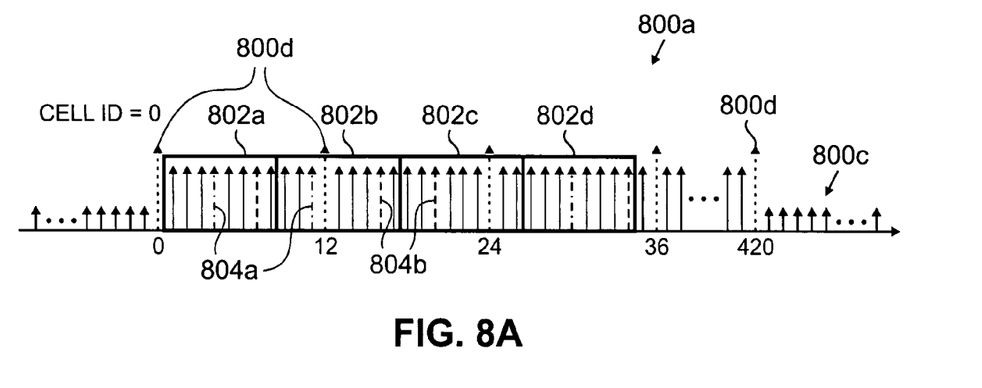
FIGS. 8A and 8B depict exemplary distributed sub-carrier allocations according to one embodiment of the present disclosure.
Figure 8B:
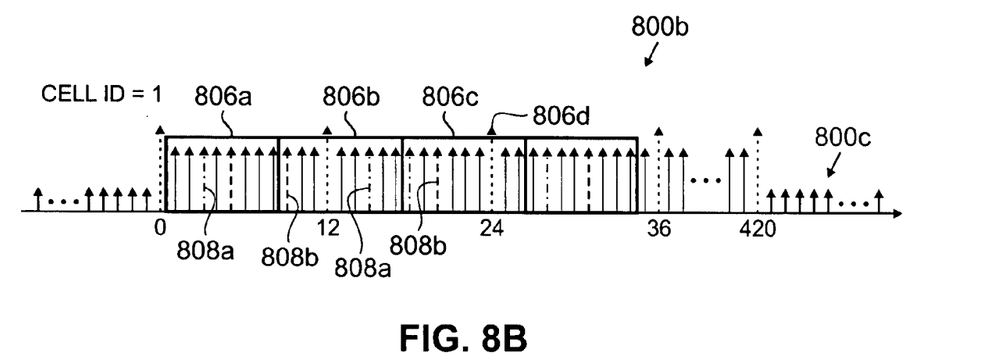

A re-arranging scheme is used to form groups of clusters such that each one of the groups (e.g., groups 502 and 506) is made up of clusters that are distributed throughout the sub-carrier space (e.g., distributed sub-carrier allocation 500). A sub-channel (e.g., sub-channels 504 and 508) in a group (e.g., groups 502 and 506) contains two (2) clusters and is comprised of forty-eight (48) data sub-carriers and eight (8) pilot sub-carriers.

Analogous to the cluster structure for DL, a tile structure is defined for the UL PUSC. The available sub-carrier space (e.g., distributed sub-carrier allocation 500) is split into tiles and six (6) tiles, chosen from across the entire spectrum by means of a re-arranging/permutation scheme, are grouped together to form a slot. The slot is comprised of forty-eight (48) data sub-carriers and twenty-four (24) pilot sub-carriers in three (3) OFDM symbols.

The IEEE-802.16-2005 Wireless MAN OFDMA mode is based on the concept of scalable OFDMA (S-OFDMA). S-OFDMA supports a wide range of bandwidths to flexibly address the need for various spectrum allocation and usage model requirements. The scalability of the OFDMA system is accomplished by adjusting the FFT size while fixing the sub-carrier frequency spacing at 10.94 kHz. Since the resource unit sub-carrier bandwidth and symbol duration is fixed, the impact to higher layers is minimal when scaling the bandwidth. An exemplary set of embodiments for S-OFDMA parameters is listed in TABLE 1 below.

TABLE 1

SCALABLE OFDMA PARAMETERS OF WIMAX

| Parameters | Values | | | |
|---|---|---|---|---|
| System Channel Bandwidth (MHz) | 1.25 | 5 | 10 | 20 |
| Sampling Frequency ($F_p$ in MHz) | 1.4 | 5.6 | 11.2 | 22.4 |
| FFT Size ($N_{FFT}$) | 128 | 512 | 1024 | 2048 |
| Number of Sub-Channels | 2 | 8 | 16 | 32 |
| Sub-Carrier Frequency Spacing | 10.94 kHz | | | |
| Useful Symbol Time ($T_b = 1/f$) | 91.4 microseconds | | | |
| Guard Time ($T_g = T_b/8$) | 11.4 microseconds | | | |
| OFDMA Symbol Duration ($T_s = T_b + T_g$) | 102.9 microseconds | | | |

TABLE 1-continued

SCALABLE OFDMA PARAMETERS OF WIMAX

| Parameters | Values |
|---|---|
| Number of OFDMA Symbols (5 ms Frame) | 48 |

Figure 6:
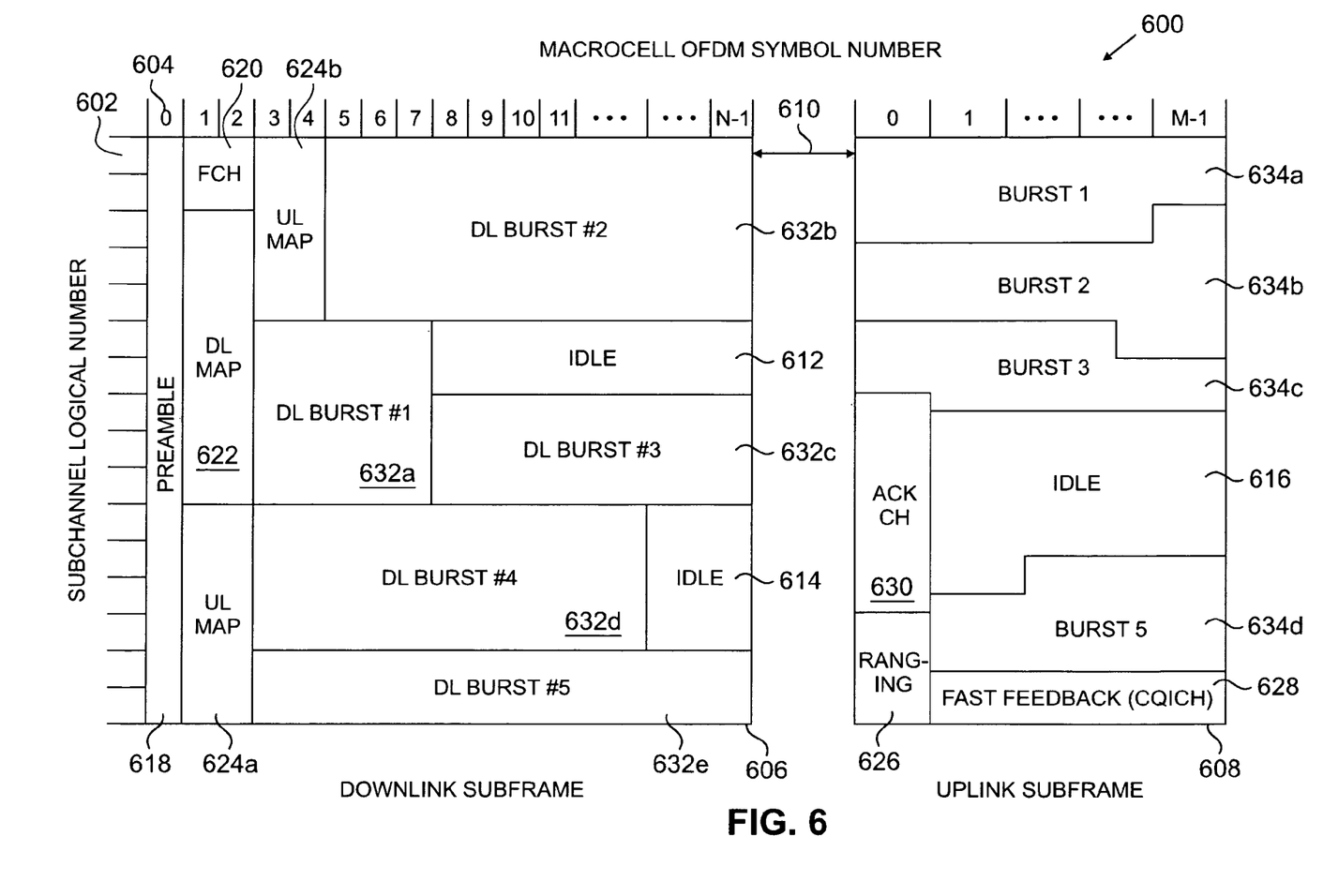
FIG. 6 is an exemplary OFDMA frame structure for a time division duplex (TDD) implementation according to one embodiment of the present disclosure.

FIG. 6 illustrates WiMAX OFDM/OFDMA broadcast frame 600 for TDD implementation according to one embodiment of the present disclosure. Broadcast frame 600 illustrates the relationship between a given sub-channel logical number 602 and a macrocell OFDM/OFDMA time slot or symbol number 604. Broadcast frame 600 is further divided into and supports sub-channelization in DL subframe 606 and UL subframe 608. DL sub-frame 606 and UL subframe 608 are separated by transmit/receive transition gaps (TTG) and receive/transmit transition gaps (RTG) (collectively referred to herein as transition gap 610). Transition gap 610 prevents DL and UL transmission collisions.

DL subframe 606 and UL subframe 608 include several unused or idle spectrum such as, for example, idle blocks 612, 614 and 616. Although a specified number of idle blocks is illustrated in DL subframe 606 and UL subframe 608, it should be understood that any number of idle blocks in fact be available in accordance with the present disclosure.

Control information for broadcast frame 600 is used to ensure optimal system operation. For example, control information may include preamble 618, frame control head (FCH) 620, DL-MAP 622, UL-MAPs 624a and 624b (collectively referred to herein as UL-MAP 624), UL ranging sub-channel 626, UL channel quality indicator channel (CQICH) 628 and UL acknowledge sub-channel (ACK) 630. Preamble 618 is used for synchronization is the first symbol number 604 of broadcast frame 600. FCH 620 follows preamble 618 and provides frame configuration information such as MAP message length, coding scheme and usable sub-channels.

DL-MAP 622 and UL-MAP 624 provide sub-channel allocation and other control information for DL subframe 606 and UL subframe 608, respectively. UL ranging sub-channel 626 is allocated for mobile stations (MS) to perform closed-loop time, frequency, and power adjustment as well as bandwidth requests. UL CQICH 628 is allocated for the MS to feedback channel state information, while UL ACK 630 is allocated for the MS to feedback DL (hybrid automatic request) HARQ acknowledgement.

Finally, DL subframe 606 is shown with several DL data bursts 632a, 632b, 632c, 632d and 632e (collectively referred to herein as DL data bursts 632). It should be understood that any suitable number of DL data bursts 632 may be included in DL subframe 606. Similarly, UL subframe 608 is shown with several UL data bursts 634a, 634b, 634c and 634d (collectively referred to herein as UL data bursts 634). It should be understood that any suitable number of UL data bursts 634 may be included in UL subframe 606.

In one embodiment, the present disclosure provides a system for secondary users to dynamically access available channels (e.g., in "white space") to broadcast IEEE-802.16 or WiMAX signals. The system provides such access to secondary users on a non-interfering or leasing basis. The term "secondary user" generally refers to a spectrum user who is not an owner of the spectrum but who operates in the spectrum based on agreements/etiquettes imposed by the primary users or regulatory entities.

The available spectrum and/or sub-carriers for use by the secondary users are time varying and location-dependent because of the traffic load and distribution of the primary users. Thus, in one embodiment, the present disclosure may use a formatted message in the downlink OFDMA frame that identifies spectrum available for use by the secondary users. In another embodiment, the present disclosure provides that the secondary users opportunistically form ad-hoc mesh network communications in fixed or mobile scenarios.

Figure 7:
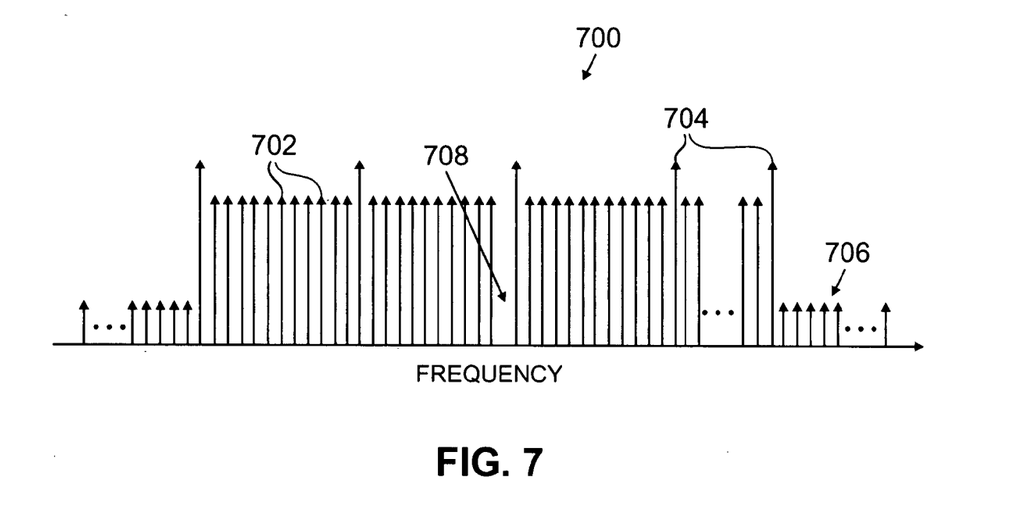
FIG. 7 depicts an exemplary downlink sub-channel construction according to one embodiment of the present disclosure.

Active sub-carriers, such as data and pilot sub-carriers, are grouped into subsets of sub-carriers called sub-channels as shown in FIG. 7. Each OFDMA symbol structure 700 typically includes four types of sub-carrier such as, for example, data sub-carriers 702, pilot sub-carriers 704, guard sub-carriers 706 and DC sub-carriers 708. Data sub-carriers 702 transport QPSL, 16-QAM, 256-QAM and other symbols. Pilot sub-carriers 704 transport known pilot symbol sequences (frequently at elevated power levels) to permit channel estimation and coherent demodulation at a receiver. Guard sub-carriers 706 are suppressed and typically permit spectrum shaping. DC sub-carriers are frequently suppressed to support direct-conversion receiver (with significant zero-frequency component ingress due to 1/f noise, etc.).

The WIMAX OFDMA PHY support sub-channelization in both DL and UL. The minimum frequency-time resource unit of sub-channelization is one slot or 48 data tones (i.e., sub-carriers). There are two types of sub-carrier permutations for sub-channelization such as, for example, diversity permutations and contiguous permutations.

The diversity permutation draws sub-carriers pseudo-randomly to form a sub-channel. Diversity permutation generally provides frequency diversity and inter-cell interference averaging as later shown in FIGS. 8A and 8B where there are 512 sub-carriers. The diversity permutations include DL FUSC, DL PUSC, UL PUSC and other optional permutations. With DL PUSC, for each pair of OFDM symbols, the available or usable sub-carriers are grouped into clusters containing 14 contiguous sub-carriers per symbol, with pilot and data allocations in each cluster in the even and odd symbols.

FIGS. 8A and 8B depict exemplary distributed sub-carrier allocations 800a and 800b (sometimes collectively referred to herein as distributed sub-carrier allocation 800) associated with a Fourier fast transform (FFT) bin number 800c according to one embodiment of the present disclosure. FIGS. 8A and 8B depict distributed sub-carrier allocations 800 in, for example, Cell ID 0 and Cell ID 1, respectively, and are referred to herein for illustration purposes only.

FIGS. 8A and 8B illustrate a sub-carrier allocation comprised of three types: (a) Data sub-carriers 804 and 808 for data transmission; (b) Pilot sub-carriers 800d for estimation and synchronization purposes; and (c) Null sub-carriers 800c used for guard bands and DC carriers. In one implementation, a fixed number of pilot sub-carriers 800d are evenly distributed among the active sub-carriers that comprise (a) and (b). As later described herein in more detail, a permutation process draws a sub-carrier pseudo-randomly from permutation groups 802 to form a sub-channel. This allocation of sub-carriers to sub-channels in a pseudorandom fashion is done so that there is a high probability that the sub-carriers for a given sub-channel in a certain cell are different than sub-carriers for that same sub-channel in another cell (for example the sub-carriers in sub-channel 1 in cell 1 will be different than the sub-carriers in sub-channel 1 in cell 2). This pseudorandom permutation provides an interference averaging effect further reducing the adverse effects of cell to cell interference.

FIG. 8A shows four groups of sub-carriers, groups 806a, 806b, 806c and 806d (collectively referred to herein as groups 806). Each of the sub-carriers depicted in groups 806 are associated with a specific sub-channel, sub-channels 808a and 808b (collectively referred to herein as sub-channels 808). Although only two sub-channels 808 are shown in FIG. 8B, it should be understood that any suitable number of sub-channels 808 may be apparent. Each of sub-channels 808 generally includes forty-eight (48) data sub-carriers.

Similarly, FIG. 8B illustrates four groups of sub-carriers, groups 806a, 806b, 806c and 806d (collectively referred to herein as permutation groups 806). Each of the sub-carriers depicted in groups 806 are associated with a specific sub-channel, sub-channels 808a and 808b (collectively referred to herein as sub-channels 808). Although only two sub-channels 808 are shown in FIG. 8B, it should be understood that any suitable number of sub-channels 808 may be apparent. Each of sub-channels 808 generally includes forty-eight (48) data sub-carriers.

Figure 9:
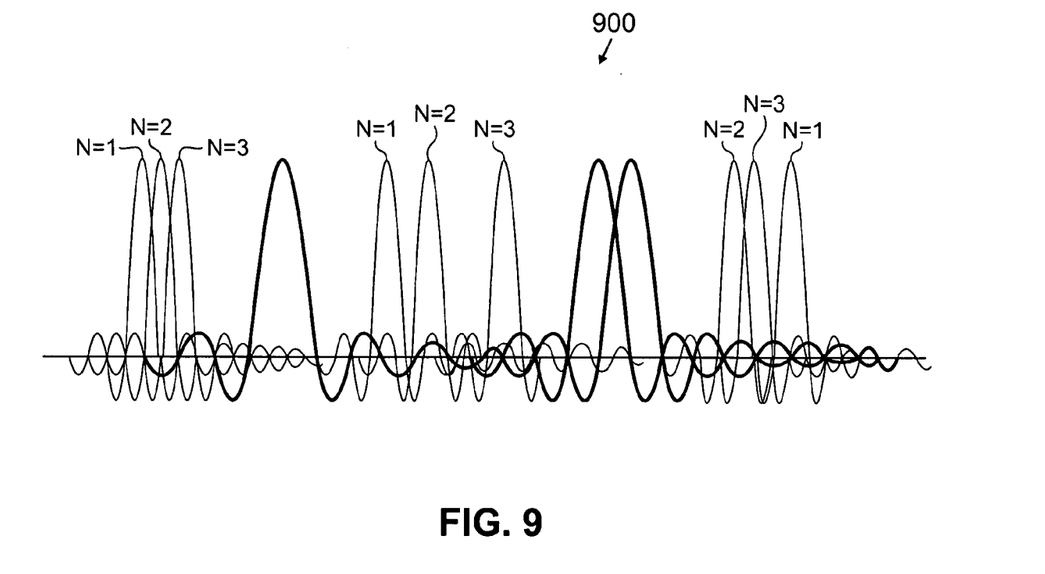
FIG. 9 depicts an exemplary secondary use OFDM symbol placement within macrocell permuted OFDMA sub-carriers according to one embodiment of the present disclosure.

FIG. 9 illustrates an exemplary secondary user OFDM symbol placement within macro-cell permuted OFDMA sub-carriers. According to one embodiment of the present disclosure, an OFDM/OFDMA signal detector in the ad hoc node of a secondary user determines idle sub-carriers in the broadcast OFDM frame for either the downlink or the uplink frame. If a secondary node does not have data to transmit, the secondary node listens for data symbols transmitted by neighboring secondary nodes on idle sub-carriers during the idle symbol periods. If a secondary node has data to transmit, the secondary node transmits data to neighboring secondary nodes on idle sub-carriers FFT bin slots during the idle symbol periods as shown in FIG. 9. Transmission by the ad hoc node within the up-link idle spectrum is similarly conducted.

In one embodiment, a secondary node with data to transmit determines if another secondary node is already transmitting in unassigned sub-carriers in the symbol slot. In this case the former secondary node waits until the next idle symbol slot and repeats the access process. If two nodes transmit simultaneously in the same OFDM symbol slot in different sub-carriers, each node does not interfere with the other since the subcarriers are orthogonal. If two secondary nodes transmit simultaneously in the same OFDM symbol slot on the same sub-carriers, that is, if unassigned sub-carriers are found to be in use by other secondary nodes, the both nodes cease transmission and wait a random number of symbol slot periods and repeat the access process.

Figure 10:
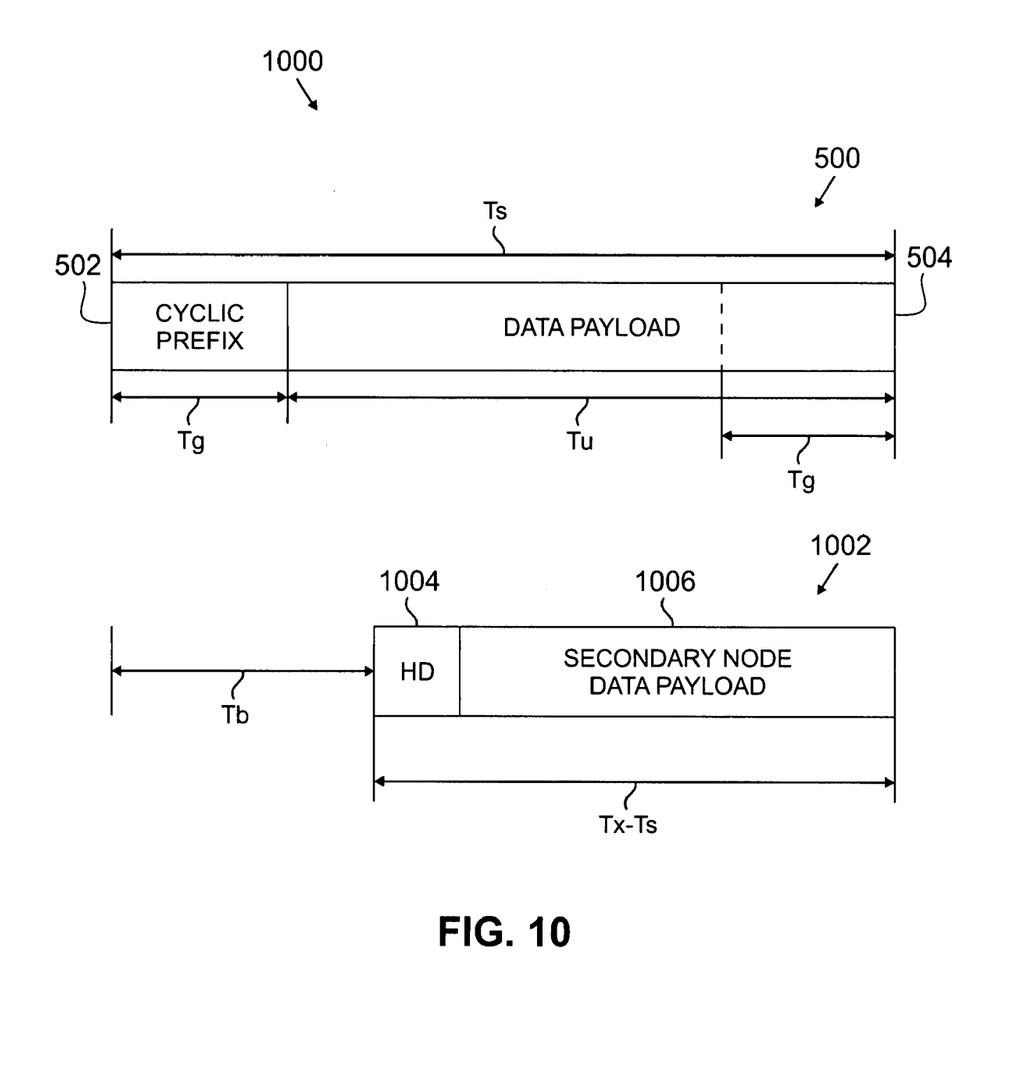
FIG. 10 depicts an exemplary OFDM symbol data payload relative to a secondary node data payload for a given OFDM symbol period according to one embodiment of the present disclosure.

FIG. 10 illustrates the relative relationship 1000 between the symbol period or length (e.g., of OFDM symbol 500 and OFDM symbol 1002) of OFDM detector system 400 (which was described earlier in conjunction with the description accompanying FIG. 4) and the symbol period or length ($T_x$) 1002 of a secondary node data burst. Symbol period 1002 is preferably kept less than or equal to in time duration of OFDM symbol period ($T_s$). The header (HD) 1004 and secondary node data burst or payload 1006 may use a variable length symbol format. However, a shorter symbol period ($T_x$) implies a greater subcarrier spacing if the secondary node modulation is based on OFDM as well. Thus, as seen in FIG. 10, the symbol period ($T_x$-$T_s$) for symbol 1002 is generally about "$T_b$" less than the same for OFDM symbol 500.

In one embodiment according to the present disclosure, the battery life for battery-powered secondary nodes may be extended. For example, secondary nodes can power-down the transmitter circuitry when there is no data to transmit. Furthermore, secondary nodes can power-down the receiver circuitry and other non-essential circuits during symbol number 604 when there are no idle sub-carriers. A secondary node powers up at the appropriate time to receive the OFDM frame, DL-MAP and UL-MAP. Preferably, to conserve energy or battery power, the ad hoc node disables any processing associated with receiving and detecting OFDM signals during the remainder of the macro-cell OFDM burst.

Figure 11:
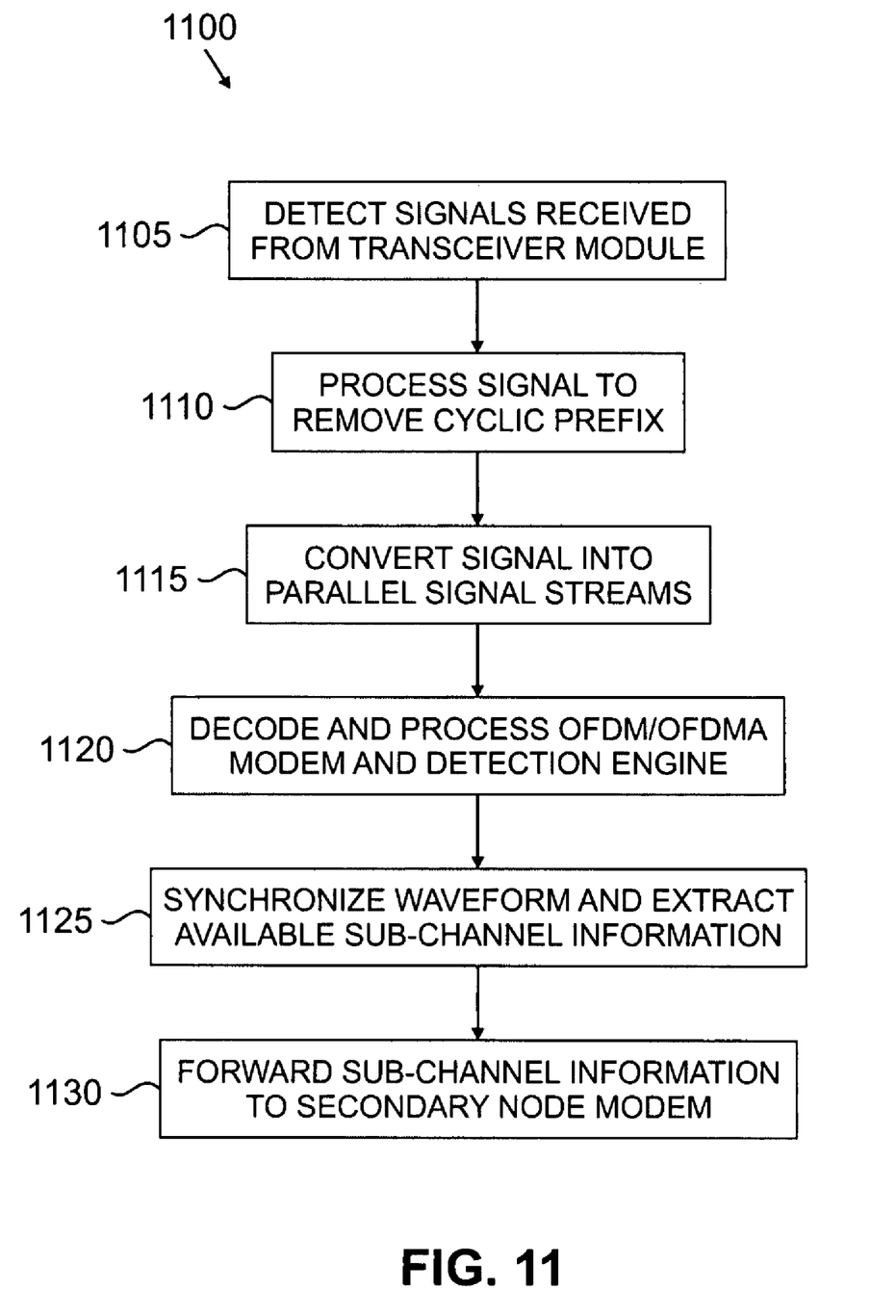
FIG. 11 is a somewhat simplified flow diagram illustrating an exemplary method of spectrum sharing in a wireless communication network according to one embodiment of the present disclosure.

FIG. 11 is a somewhat simplified flow diagram of method 1100 for spectrum sharing using OFDM/OFDMA signaling according to one embodiment of the present disclosure. In step 1105, an OFDM/OFDMA frame detector detects signals received from a transceiver module, such as transceiver 406.

In step 1110, the signal is passed to a synchronizer, such as synchronizer module 438, where the CP is removed and the signal is synchronized with an OFDM/OFDMA frame such as, for example, frame structure 600 according to one embodiment of the present disclosure. The signal is also separated into parallel data streams (e.g., $X_0 \ldots X_{N-1}$). A MAP within synchronizer 438 maps each data stream into I and Q modulation symbols.

In step 1115, the signal is then passed to an FFT block, such as FFT block 440. In step 1120, the data streams are passed to parallel-to-serial converter, such as parallel-to-serial block 442. The signal is demodulated in a demodulator, such as demodulator 444, and then output to a decoder, such as decoder block 446.

In step 1125, a frame detector such as, for example frame detector 448) detects the decoded signal and extracts any idle block information. In step 1130, frame detector 448 outputs the signal, idle block information and sub-channel information to a node modem, such as node modem 436 and controller 420.

Accordingly, method 1100 provides secondary users with dynamic access to channel availability through the use of frame detector 448 and controller 420 in broadcast wireless waveforms such as, for example, in IEEE-802.16 or WiMAX, in a non-interfering or leasing basis.

In describing method 1100 and system 400, "secondary users" generally refers to spectrum users who are not owners of the spectrum but who operate in the spectrum based on agreements/etiquettes imposed by the primary users or regulatory entities. For example, using method 1100, secondary users of system 400 dynamically form ad-hoc mesh network communications in fixed or mobile scenarios. In other words, secondary users refer to spectrum users who are not owners of the spectrum but who operate in the spectrum based on agreements/etiquettes imposed by the primary users or regulatory entities. For example, secondary users of method 1100 may dynamically form ad-hoc mesh network communications in fixed or mobile scenarios.

Although the present disclosure has been described with an exemplary embodiment, various changes and modifications may be suggested to one skilled in the art. For example, the present disclosure primarily describes spectrum sharing in a WiMAX communication network, it should be understood, however, that embodiments of the present disclosure may be used in any suitable wireless communication system.

It is intended that the present disclosure encompass such changes and modifications as fall within the scope of the appended claims.

What is claimed is:

1. A spectrum sharing system for use in a wireless communication system having a primary user node and a secondary user node, the system comprising:
   a frame detector in the secondary user node configured to detect a frame of a broadcast waveform and to extract subframe information including idle blocks in the frame, wherein the frame comprises transmitted data; and
   a controller configured to identify sub-carriers for the frame usable by the secondary user node from the subframe information, wherein the secondary user node transmits data in a first one of usable sub-carriers identified in the subframe information.

2. The system set forth in claim 1, wherein the frame detector is one of:
an OFDM frame detector and an OFDMA frame detector.

3. The system set forth in claim 1, wherein the broadcast waveform is one of: an OFDM waveform and an OFDMA waveform.

4. The system set forth in claim 1, wherein the secondary user node comprises a node modem.

5. The system set forth in claim 4, wherein the node modem is a MANET node modem.

6. The system set forth in claim 4, wherein the node modem and the frame detector are synchronized.

7. The system set forth in claim 1, wherein the secondary user node extracts usable pilot sub-carriers for the frame.

8. The system set forth in claim 1, wherein a second secondary user node transmits data in a second usable sub-carrier identified in the subframe information.

9. The system set forth in claim 1, wherein the wireless communication system is a WiMAX communication system.

10. For use in a wireless communication network having a primary user node and a secondary user node, a method of spectrum sharing, the method comprising:
detecting a frame of a broadcast waveform in the secondary node;
extracting subframe information including idle blocks in the frame, wherein the frame comprises transmitted data;
identifying sub-carriers for the frame usable by the secondary user node from the subframe information; and
transmitting data from the secondary user node in a first sub-carrier identified in the subframe information.

11. The method set forth in claim 10, wherein the detecting the frame is accomplished by one of: an OFDM frame detector and an OFDMA frame detector.

12. The method set forth in claim 10, wherein the broadcast waveform is one of: an OFDM waveform and an OFDMA waveform.

13. The method set forth in claim 10, wherein the secondary user node comprises a node modem.

14. The method set forth in claim 13, wherein the node modem is a MANET node modem.

15. The method set forth in claim 13, further comprising:
synchronizing the node modem and the frame detector.

16. The method set forth in claim 10, further comprising:
extracting usable pilot sub-carriers for the frame.

17. The method set forth in claim 10, further comprising:
transmitting data from a second secondary user node into a second sub-carrier identified in the subframe information.

18. The method set forth in claim 10, further comprising:
dynamically forming an ad hoc mesh network with the secondary user node.

19. The method set forth in claim 10, wherein the wireless communication network is a WiMAX communication network.

20. For use in a wireless communication system, an apparatus for forming an ad hoc mesh network, the apparatus comprising:
a secondary user node having a node modem; and
a frame detector in the secondary user node configured to detect a frame of a broadcast waveform and extract subframe information including idle blocks in the frame wherein the frame comprises transmitted data,
wherein the secondary user node transmits data in a first unused sub-carrier identified in the subframe information.

21. The apparatus set forth in claim 20, wherein the node modem and the frame detector are synchronized.

22. The apparatus set forth in claim 20, wherein the secondary user node extracts usable pilot sub-carriers for the frame.

23. The apparatus set forth in claim 20, wherein wireless communication system is a WiMAX communication system.

* * * * *